(12) United States Patent
Lim et al.

(10) Patent No.: US 9,911,177 B2
(45) Date of Patent: Mar. 6, 2018

(54) APPLYING CHROMA SUPPRESSION TO IMAGE DATA IN A SCALER OF AN IMAGE PROCESSING PIPELINE

(71) Applicant: Apple Inc., Cupertino, CA (US)

(72) Inventors: Suk Hwan Lim, Mountain View, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 14/841,400

(22) Filed: Aug. 31, 2015

(65) Prior Publication Data

US 2017/0061576 A1 Mar. 2, 2017

(51) Int. Cl.
*G09G 5/02* (2006.01)
*G06T 3/40* (2006.01)
*H04N 5/213* (2006.01)
*H04N 7/01* (2006.01)
*H04N 9/70* (2006.01)

(52) U.S. Cl.
CPC ............... *G06T 3/40* (2013.01); *H04N 5/213* (2013.01); *H04N 7/0117* (2013.01); *H04N 9/70* (2013.01)

(58) Field of Classification Search
None
See application file for complete search history.

(56) References Cited

U.S. PATENT DOCUMENTS

| 5,355,176 A | 10/1994 | Inagaki et al. |
| 7,995,242 B2 | 8/2011 | Dalrymple et al. |
| 8,953,882 B2 | 2/2015 | Lim et al. |
| 2011/0317755 A1 | 12/2011 | Lancaster et al. |
| 2013/0322752 A1* | 12/2013 | Lim .................... G06T 5/20 382/167 |
| 2014/0078393 A1 | 3/2014 | Li et al. |

* cited by examiner

*Primary Examiner* — Peter Hoang
(74) *Attorney, Agent, or Firm* — Robert C. Kowert; Meyertons, Hood, Kivlin, Kowert & Goetzel, P.C.

(57) ABSTRACT

An image processing pipeline may apply chroma suppression to image data at a scaler implemented in the image processing pipeline. Image data collected for an image may be received at a scaler that is encoded in a color space that includes a luminance component and chrominance components. When resampling the image data to generate a different size of the image, the scaler may attenuate the chrominance components of the image data according to the luminance component of the image data. The scaler may also perform dot error correction and convert the image data from one subsampling scheme to another.

20 Claims, 8 Drawing Sheets

APPLYING CHROMA SUPPRESSION TO IMAGE DATA IN A SCALER OF AN IMAGE PROCESSING PIPELINE

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to apply chroma suppression to image data when scaling image data. Chroma suppression may attenuate the chrominance components of image data received at a scaler to remove different errors and artifacts that may be introduced into image data during the capture and processing of the image data. The luminance value of the image data may control the aggressiveness of the attenuation of the chrominance data. Once chroma suppression is applied, image data may be resized. Subsampling of chrominance components from one scheme to another may also be performed when scaling.

Figure 1:
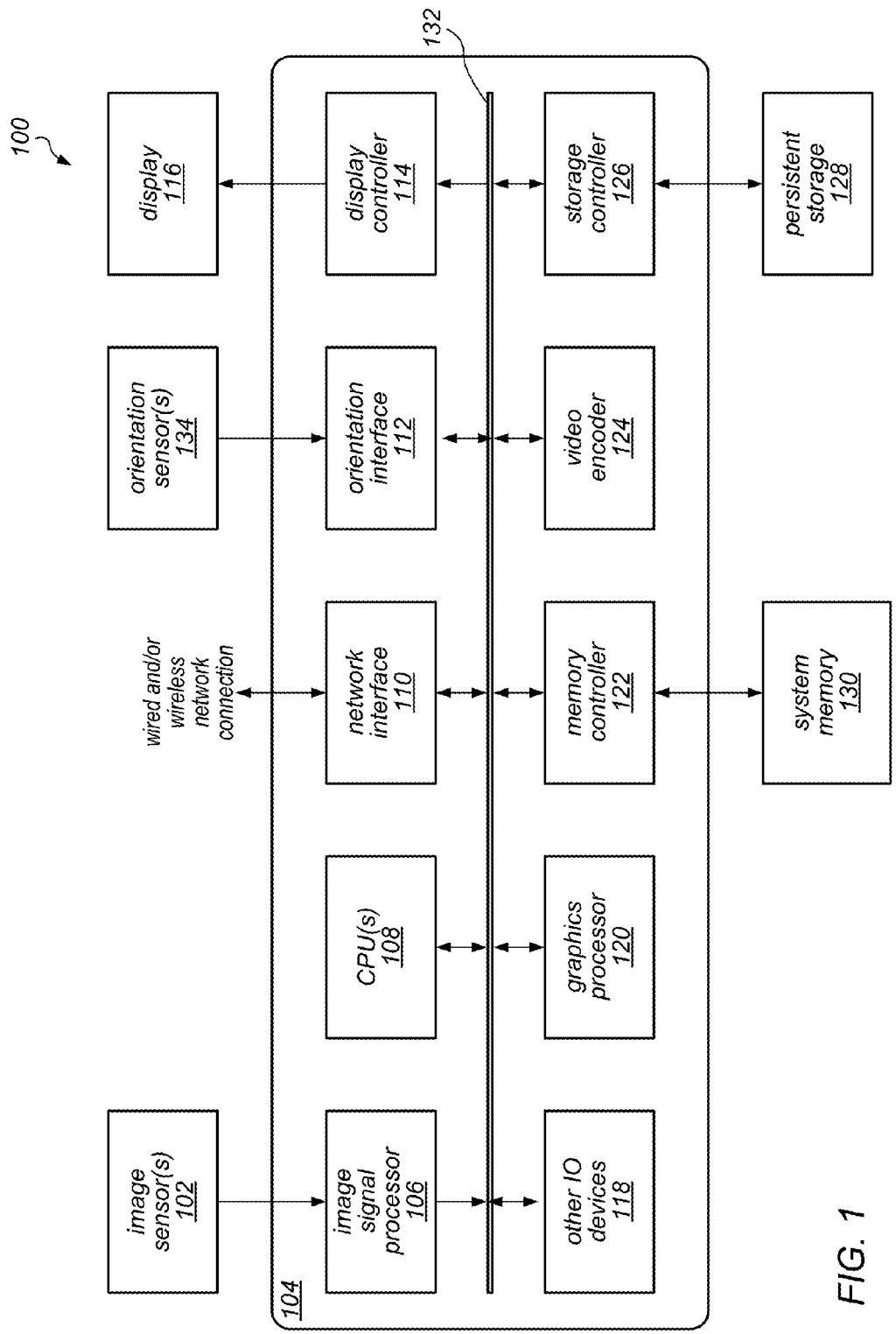
FIG. 1 is a logical block diagram illustrating an example system that may implement an image processing pipeline that applies chroma suppression to image data in a scaler, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to process image data captured by an image sensor. However, as image data is captured and processed various modifications to image data may create errors or artifacts in image. Many different techniques to account for and correct these errors and artifacts may be performed. One such technique is chroma suppression. Chroma suppression may be applied to reduce the chrominance components of image data encoded in a luminance-chrominance (YCC or YCrCb) color space. Reducing the chrominance components in certain areas and to certain degrees in an image may remove many different types of errors such as aliasing artifacts and color moiré. An image signal processor or other image processing pipeline may implement a scaler that applies chroma suppression to image data as part of resizing an image in order to efficiently implement chroma suppression to remove such errors in the image.

The techniques described herein for applying chroma suppression to image data in a scaler may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
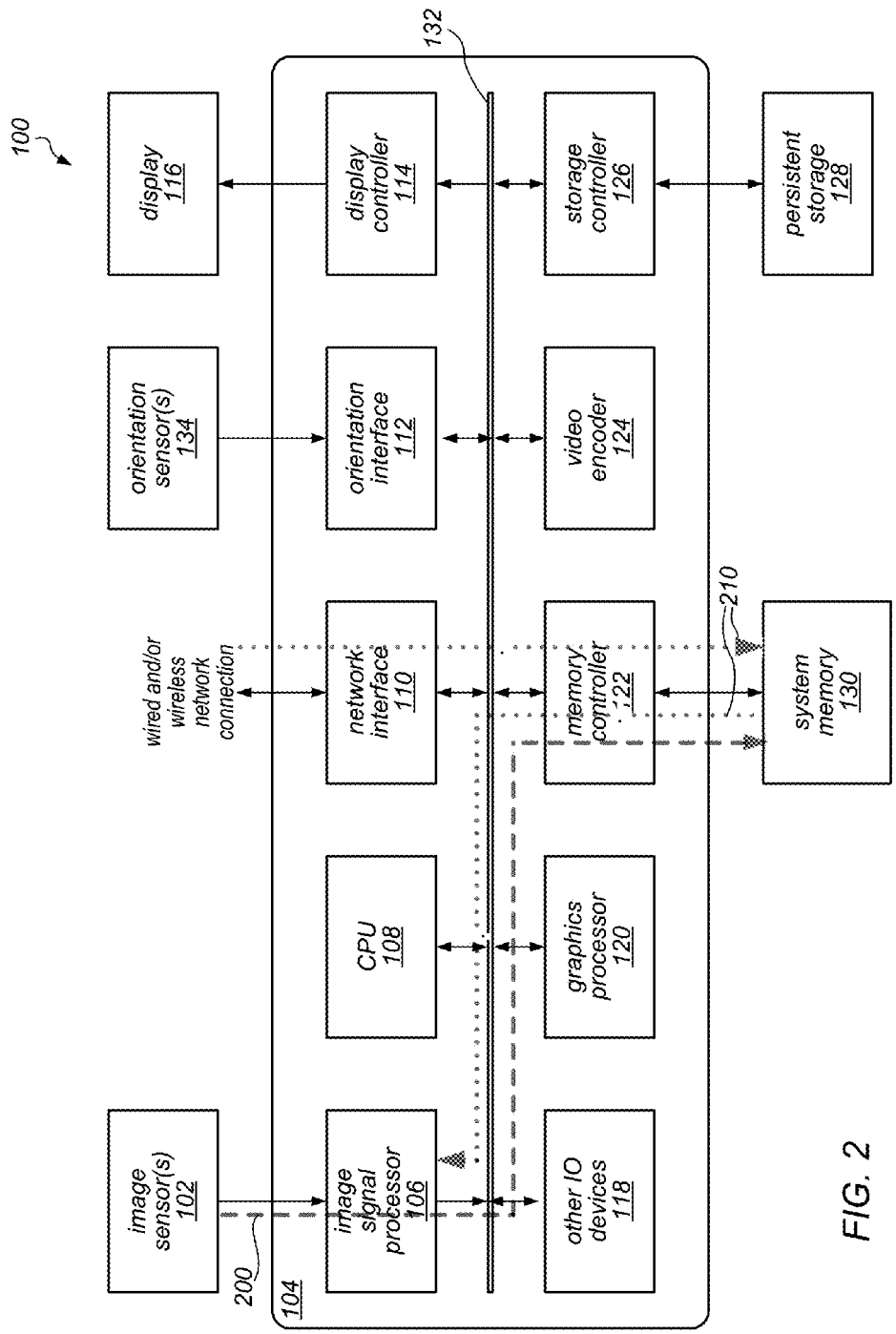
FIG. 2 is a logical block diagram illustrating example data paths in a system that may implement an image processing pipeline that processes image data at multiple rates, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received by system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
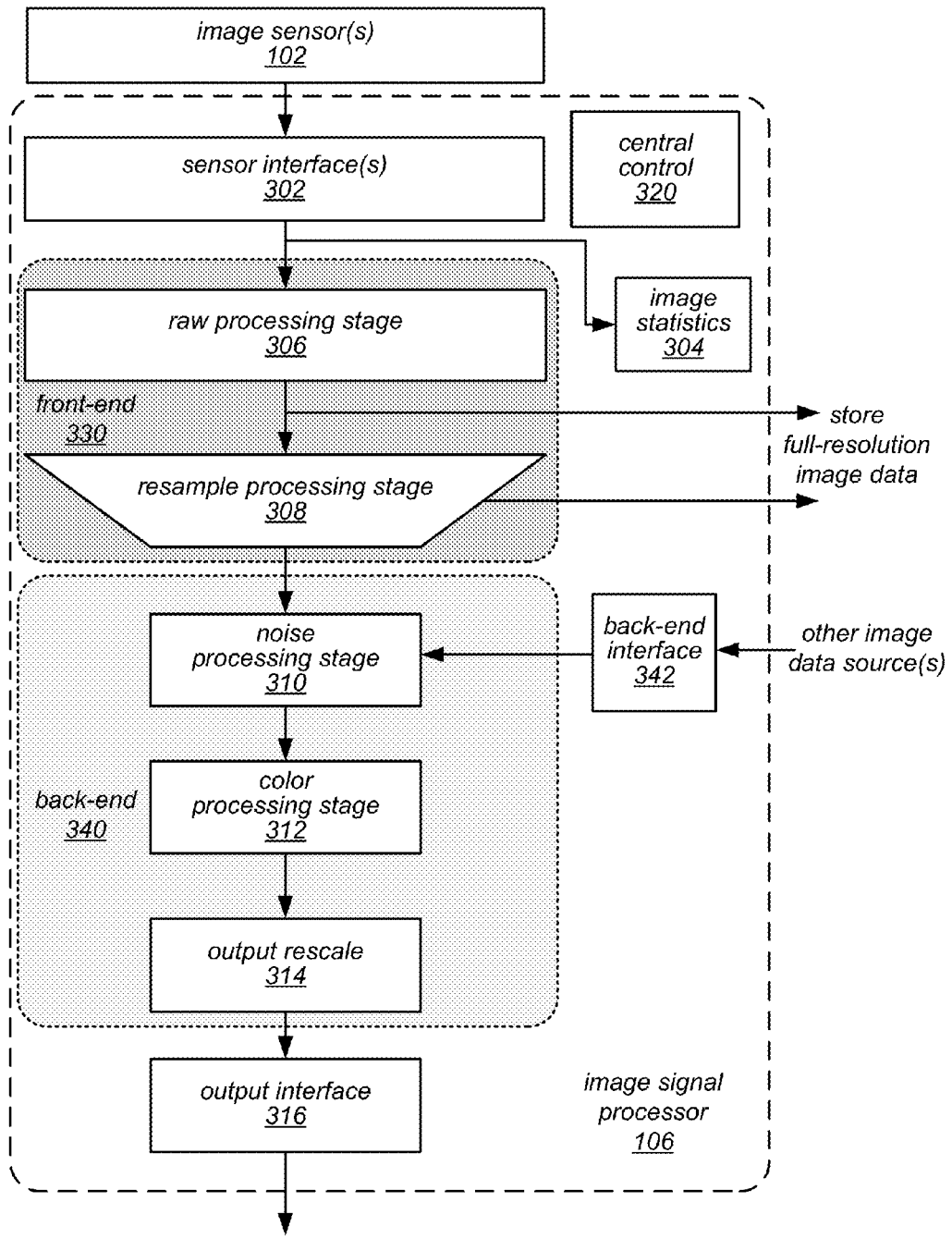
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342, as discussed below with regard to FIG. 6, may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels' values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 306 may, in various embodiments implement a variety of modules, units, or components to perform various operations, functions, or tasks on raw image data. Bayer raw format, for example, may be image data collected from image sensor(s) 102 that implement a Bayer pattern of pixel sensors. For instance, some pixel sensors only capture green light, while other pixel sensors capture red or blue light in Bayer pattern of pixels. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr, R, B, Gb) on the pixels' image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr, R, B, Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, as discussed in further detail below with regard to FIG. 4, and may provide as output image data accordingly at a reduced rate such as may be processed by a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate >3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-6) may be implemented in various combinations of hardware or software.

Figure 4:
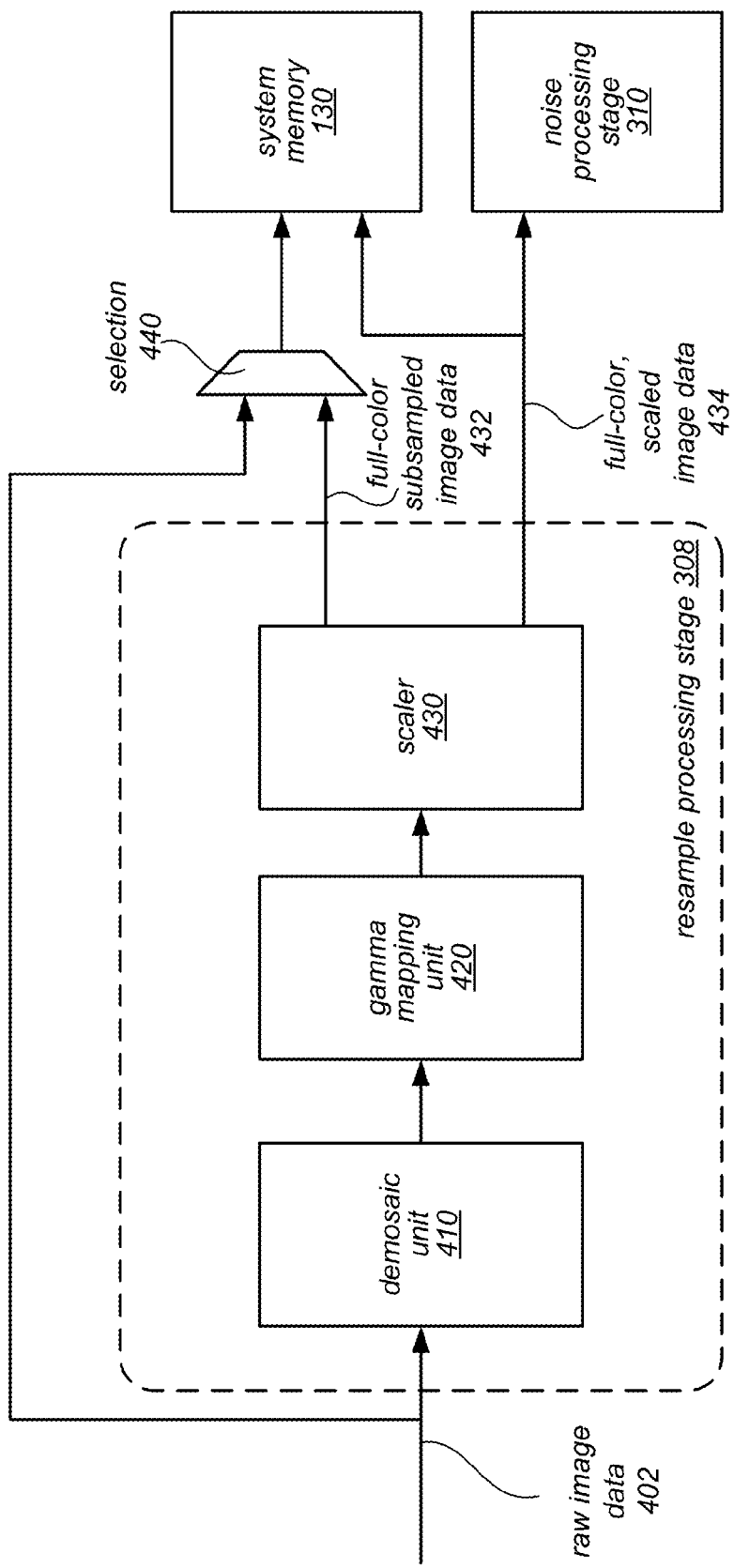
FIG. 4 is a logical block diagram illustrating a resample processing stage in an image signal processor, according to some embodiments.

As noted above, in various embodiments different stages may be configured to process image data at different rates, such as front-end pipeline stages 330 processing image data at an initial rate and back-end pipeline stages 340 processing image data at a reduced rate. Resample processing stage 308 may, in various embodiments, be configured to receive image data from raw processing stage at the initial data rate, process the image data, and provide output image data at the reduced image rate. FIG. 4 is a logical block diagram illustrating a resample processing stage in an image signal processor, according to some embodiments.

Raw image data 402 may be received from raw processing stage 306 (or from another input such as a memory for processing at resample processing stage 308. As with raw processing stage resample processing stage 308 may process image data at the initial rate described above. Thus, demosaic unit 410, gamma mapping unit 420, and scaler 430 may process input image data according to the initial data rate. In various embodiments, scaler 430 may provide one or more multiple outputs of image data at the same or different rates. For instance, in some embodiments, scaler 430 may provide image data that is in the full-color domain and scaled 434 at a reduced rate to noise processing stage 310 for further processing. In some embodiments, the full-color scaled image data 434 may be additionally (or alternatively) written to system memory 130 to be stored for future processing or display. In at least some embodiments, scaler 430 may provide full-color image data that has been resampled (if not downscaled) as output (in addition to or instead of full-color scaled image data 434). For example, scaler 430 may subsample full resolution image data in YCbCr 4:4:4 format to YCbCr 4:2:2 format, reducing the chrominance color components (without reducing the luminance color component) and provide the full resolution image data in the subsampled format as output.

In some embodiments, selection component 440 may be implemented so that central control module 320, or another component, may program image signal processor 106 to store raw image data 402 in system memory 130 or full-color subsampled image data 432. In this way, a version of image data that is not scaled (e.g., a full resolution image) may be stored in memory in raw or full-color format, while a scaled version of the image continues processing as full-color scaled image data 434 at other pipeline stages. For instance, an image frame may be captured at full resolution and saved as a high resolution image and processed and displayed as a lower resolution preview image. In another example, a high resolution image frame may be captured while processing a lower resolution version of the image frame to be stored as part of a video file (e.g., a 1080p video file).

Demosaic unit 410 may convert or interpolate missing color samples from raw image data 402 to output image data into a full-color domain. For instance, as discussed above, raw image data 402 may not include multiple color components or channels for an individual pixel (e.g., the pixel is a green, red, or blue pixel in a Bayer pattern) when collecting image data from an image sensor, such as a color filter array (CFA). A full-color domain, as noted earlier, may include multiple color channels or components for an individual pixel in order to provide a color value for the pixel within a color space that is greater than any one color channel or component (e.g., color spaces that include red, blue, and green color combinations). In some embodiments, demosaic unit 410 performs interpolation based on a Bayer CFA pattern. For example, demosaic unit 410 may use a 5×5 edge-adaptive filter working on original image sensor samples to perform green channel interpolation. A low pass directional filter may be applied to a green pixel value and a high pass (or gradient) filter may be implemented on the color channel adjacent to green on the same row (either red or blue depending on the row on which the green pixel is located). For interpolating the red and blue channels, demosaic unit 410 may implement a low pass filter of the red or blue pixel value along with a high pass filter using the interpolated green values adjacent to the red or blue pixel. In some embodiments, green non-uniformity correction may be implemented as part of demosaic unit 410 in order to account for brightness differences between green pixel values adjacent to red pixels and green pixels adjacent to blue pixels.

Gamma mapping unit 420 may be implemented, in some embodiments, as part of resample processing stage 308 and may receive the converted image data from demosaic unit 410 as input. Gamma mapping unit 420 may map the converted image data from input image data values to output data values in order to perform special image effects, including black and white conversion, sepia tone conversion, negative conversion, or solarize conversion. For example, gamma mapping unit 420 may utilize lookup tables (or other structures that index pixel values to another value) for different color components or channels of each pixel (e.g., a separate lookup table for Y, Cb, and Cr color components). These values represent the output levels which may map an input pixel value to a low and a high mapping value. The output value for the input pixel value may be determined by performing a linear interpolation between the low and high mapping values for the input pixel. Central control module 320 may configure the lookup table values (or other gamma mapping unit 420 control parameters) to map values that correspond to applying the various special effects.

Resample processing stage 308 may implement scaler 430 to receive image data from gamma mapping unit 420 (or from demosaic unit 410 (not illustrated)) to perform various scaling, resampling, or other image data operations on the converted image data in the full-color domain. In at least some embodiments, scaler 430 may operate in multiple modes which provide different types of scaled, resampled, or otherwise modified image data output. For instance, scaler 430 may provide a mode that corrects or suppresses artifacts in the image data (e.g., such as suppressing chroma aliasing artifacts to remove the aliasing artifacts near luminance edges that may have been introduced by the demosaic unit 410 or removing dot artifacts introduced by the demosaic unit 410) without scaling the image data (though the output of scaler 430 may still provide the image data according to a reduced rate as discussed above). Another mode for scaler 430 mode may perform image downscaling and resampling (in addition to, or instead of, correcting or suppressing artifacts in the image data), in some embodiments. For example, scaler 430 may receive as input image data in a YCbCr 4:4:4 format and convert the subsampling scheme for the image data into YCbCr 4:2:2 format (which may reduce the CbCr (chrominance) data to half that of Y (luminance)). Scaler 430 may then downscale the reformatted image data (e.g., by performing vertical and horizontal resampling), changing the image size from one resolution (e.g., a full-sensor resolution image) to a different resolution (e.g., a video resolution, such as 1080p). In some embodiments, scaler 430 may also correct or suppress artifacts in the scaled image data as discussed above. Central control module 320 may, in various embodiments, configure the mode or other operations, such as the downscaled size of the image data that may be performed by scaler 430 on input image data.

Figure 5:
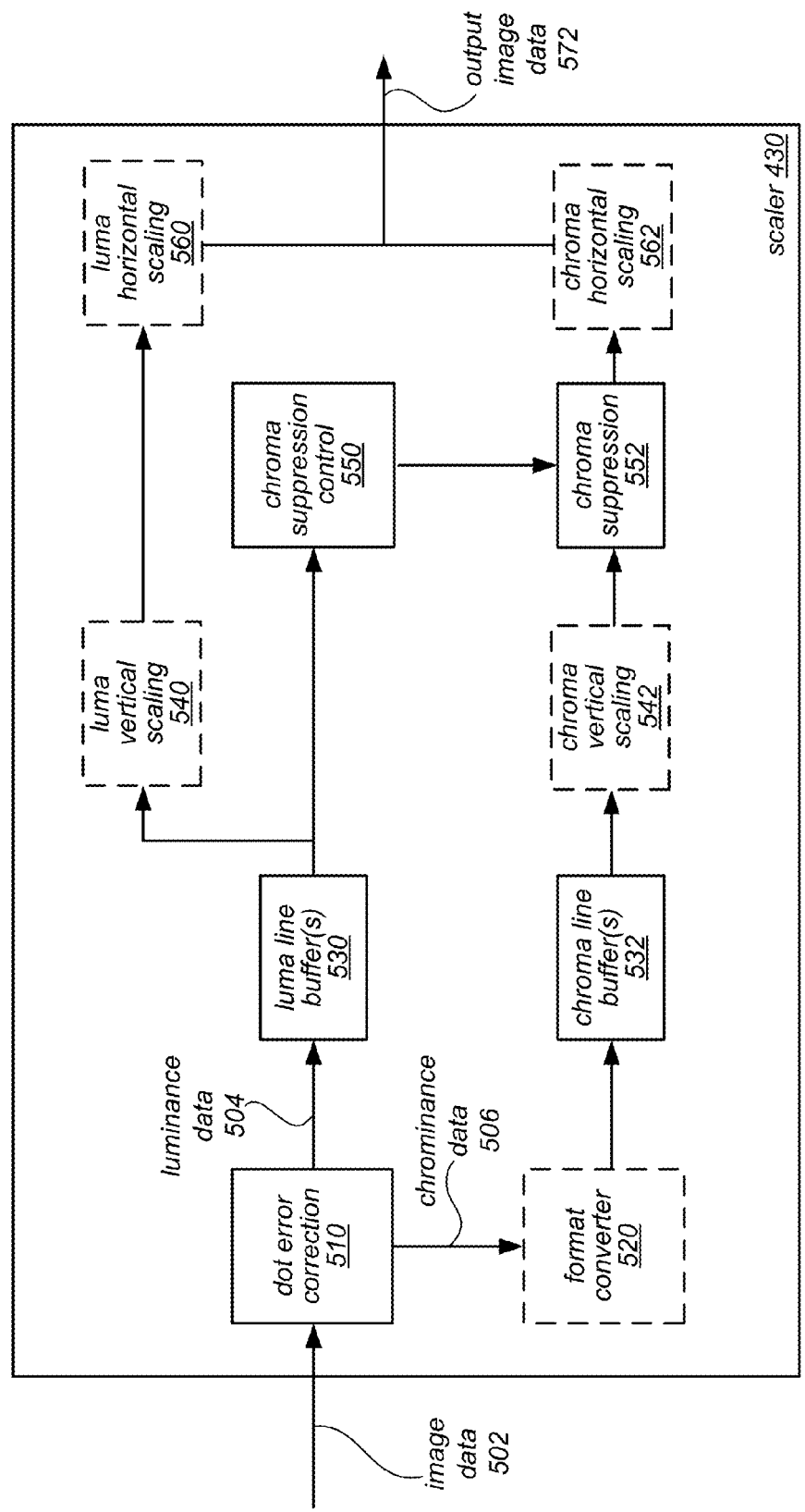
FIG. 5 is a logical block diagram illustrating a scaler that applies chroma suppression to image data, according to some embodiments.

FIG. 5 is a logical block diagram illustrating a scaler that applies chroma suppression to image data, according to some embodiments. As noted above, scaler 430 may receive image data 502 from another unit in resample processing stage, such as gamma mapping unit 420. Image data 502 may be encoded in a color space that includes a luminance component (Y) and chrominance components (Cr and Cb). In at least some embodiments, scaler 430 may implement dot correction unit 510. Dot correction unit 510 may perform techniques to remove dot errors from image data (e.g., dot error correction techniques discussed below with regard to FIGS. 7A and 7B, which may be introduced into the image data in previous processing stages (e.g., demosaic unit 410)). In at least some embodiments, dot error correction unit 510 may only apply dot error correction to luminance channel values for image data 502. For example, dot error detection unit 510 may determine a dot detection value for a given pixel, add or subtract the detection value from the luminance value, and compare the result to a neighborhood of pixels. If the result fails one or more conditions with respect to the neighborhood pixels. A corrected luminance value for the given pixel may be determined by interpolating the luminance value of the given pixel with respect to a direction gradient of the neighborhood of pixels. Otherwise the luminance value may remain uncorrected if the result does not fail the comparison conditions.

In some embodiments, scaler 430 may implement format converter 520 to convert chrominance data 506 (the chrominance components Cr and Cb from image data 502). Format converter 520 may change the format of chrominance data 506 from one format to another. For instance, image data 502 may be encoded in YCrCb 4:4:4 format. Format converter 520 may apply a decimation filter to reduce chrominance data 506 by a factor of two to produce YCrCb 4:2:2 image data. In this way, some processing units subsequent to format converter 520 may save resource space (e.g., line buffer space) when storing the smaller amount of image data.

In order to provide spatial support for scaling and/or chroma suppression techniques, scaler 430 may implement line buffers, such as luma line buffer(s) 530 and chroma line buffer(s) 532 (which receive luminance data 504 and chrominance data 506 respectively). Line buffers 530 and 532 may store image data to provide spatial support (e.g., neighboring pixel values for applying various filters to luminance data 504 or chrominance data 506 for scaling, chroma suppression, or other techniques as part of scaler 430). The same line buffers 530 and 532 may be utilized for different configurations of scaler 430, some of which are discussed below (e.g., scaling with chroma suppression, scaling without chroma suppression, or non-scaling with chroma suppression). Line buffers may be implemented by memory-based storage devices, in some embodiments.

In various embodiments, scaler 430 may implement chroma suppression control 550 and chroma suppression 552 to apply chroma suppression to chrominance data 506. Chroma suppression may be applied to chrominance data 506 that has changed format (e.g., by format converter) or been scaled vertically (e.g., by chroma vertical scaling 542). Chroma suppression may also be applied to unchanged or unscaled chrominance data 506. Chroma suppression may be implemented in different ways. For instance, chroma suppression control 550 may determine, control, or guide the amount of chroma suppression applied to chrominance data 506. Chroma suppression unit 552 may attenuate chrominance data 506 to suppress chroma values which may include various image data errors, defects, or artifacts (e.g., color aliasing artifacts near luminance edges).

Chroma suppression control 550 may control attenuation at chroma suppression unit 552 by determining a blending ratio for chrominance data 506 (with other values, such as a neutral gray values and low-pass values of chrominance data 506). To determine the blending ratio, chroma suppression control may determine a value for a frequency range of the luminance data 504. For example, a high pass filter may be implemented (e.g., convolving luminance data 504 with a 5×5 linear filter) to determine a high pass filtered value for luminance data 504. The filtered value may be used to interpolate the blending ratio with respect to a lookup table (e.g., a lookup table with 129 entries with input samples evenly distributed between 0 and a max blending value). In this way the attenuation strength (as determined by the blending ratio) may be increased to reduce chrominance data 506 as some image data artifacts are detected with greater frequency in areas of an image with high pass luminance values. Orientation of components of chrominance data 506, Cr and Cb, may also be used to adjust the attenuation strength. For example, an arctangent may be applied to determine an orientation value based on Cr and Cb. The orientation value may then be used to determine an orientation based modification to the attenuation applied to chrominance data 506.

Chroma suppression unit 552 may attenuate chrominance data 506 according to a determined blending ratio (and possibly other modifications, such as orientation) to chrominance data 506 received from chroma suppression control 550. To attenuate chrominance data 506, chroma suppression unit 552 may blend a frequency range of chrominance data 506 and a neutral value. The frequency range of chrominance data 506 may be a low pass version of chrominance data 506 obtained by applying a filter to chrominance data 506 (e.g., a 7×7 linear filter to convolve chrominance data 506). The neutral value may, in some embodiments be a default or programmed value (e.g., via central control module 320). Chroma suppression unit 552 may blend the two values (low pass version and neutral) according to the blending ratio (e.g., blended value of chrominance data 506=(blending ratio*low pass version)+((1−blending ratio)* neutral value)).

Scaler 430 may implement luma vertical scaler 540, luma horizontal scaler 560, chroma vertical scaler 542, and chroma horizontal scaler 562 to perform scaling for image data 502 of image frames that are being scaled. For example, luma vertical scaler 540 and chroma vertical scaler 542 may scale luminance data 504 and chrominance data 506 with respect to a vertical direction. For instance, luma vertical scaler 540 and chroma vertical scaler 542 may be implemented as polyphase resampling filters (e.g., 16-phase polyphase resampling filters) that rely upon spatial support from line buffers 530 and 532 to vertically scale image data. The polyphase filters may implement dynamically, distributed arithmetic (DDA) to generate filter coordinates and phases. Filter coefficients for luma vertical scaler 540 may be different than filter coefficients for chroma vertical scaler 542. Luma horizontal scaler 560 and chroma horizontal scaler 562 may be similarly implemented to perform horizontal scaling, in various embodiments (e.g., implementing a polyphase filter that utilizes DDA to generate filter coordinates and phases). Note that, in at least some embodiments, chroma suppression is applied between the vertical 542 and horizontal scaling 562 of chrominance data 506.

Format converter 520 (along with other units in scaler 430 highlighted by dashed outlines, such as luma vertical scaling unit 540, chroma vertical scaling unit 542, luma horizontal scaling unit 560, and chroma horizontal scaling unit 562) may be configured to be performed for some image frames and not for other image frames. For example, format converter 520 may be enable to change the subsampling schema of image data 502 (e.g., change chroma subsampling from an initial scheme (e.g., YCrCb 4:4:4, which has no subsampling) to a different format (e.g., with a subsampling scheme of YCrCb 4:2:2). Similarly, scaling may be performed for some image frames and not for others (though chroma suppression may still be applied at chroma suppression unit 552) so luma vertical scaling unit 540, chroma vertical scaling unit 542, luma horizontal scaling unit 560, and chroma horizontal scaling unit 562 may be disable or enabled from frame to frame. Additionally many of the various units illustrated in scaler 430 may be programmed or configured (e.g., according to input parameters or other control variables) which may be programmed or configured by an ISP controller (e.g., via central control module 320). Thus, output image data 572 may be scaled, non-scaled, chroma suppressed, non-chroma suppressed or reformatted according to the configuration of scaler 430 for an image frame being processed.

Please note that FIGS. 4 and 5 are provided as merely an example of a resample processing stage 308 and scaler 430. Different combinations of the illustrated components (as well as components not illustrated) may be used to perform conversion from raw image data into a full-color domain or scale image data. For example, in some embodiments output selection component 440 may not be implemented. Thus, the components of FIG. 4 and their respective layout or ordering is not intended to be limiting to the various other combinations which may be used to resample processing stage 308. Similarly, in some embodiments, shared line buffers, or subsampling format converters may not be implemented in a scaler.

Figure 6:
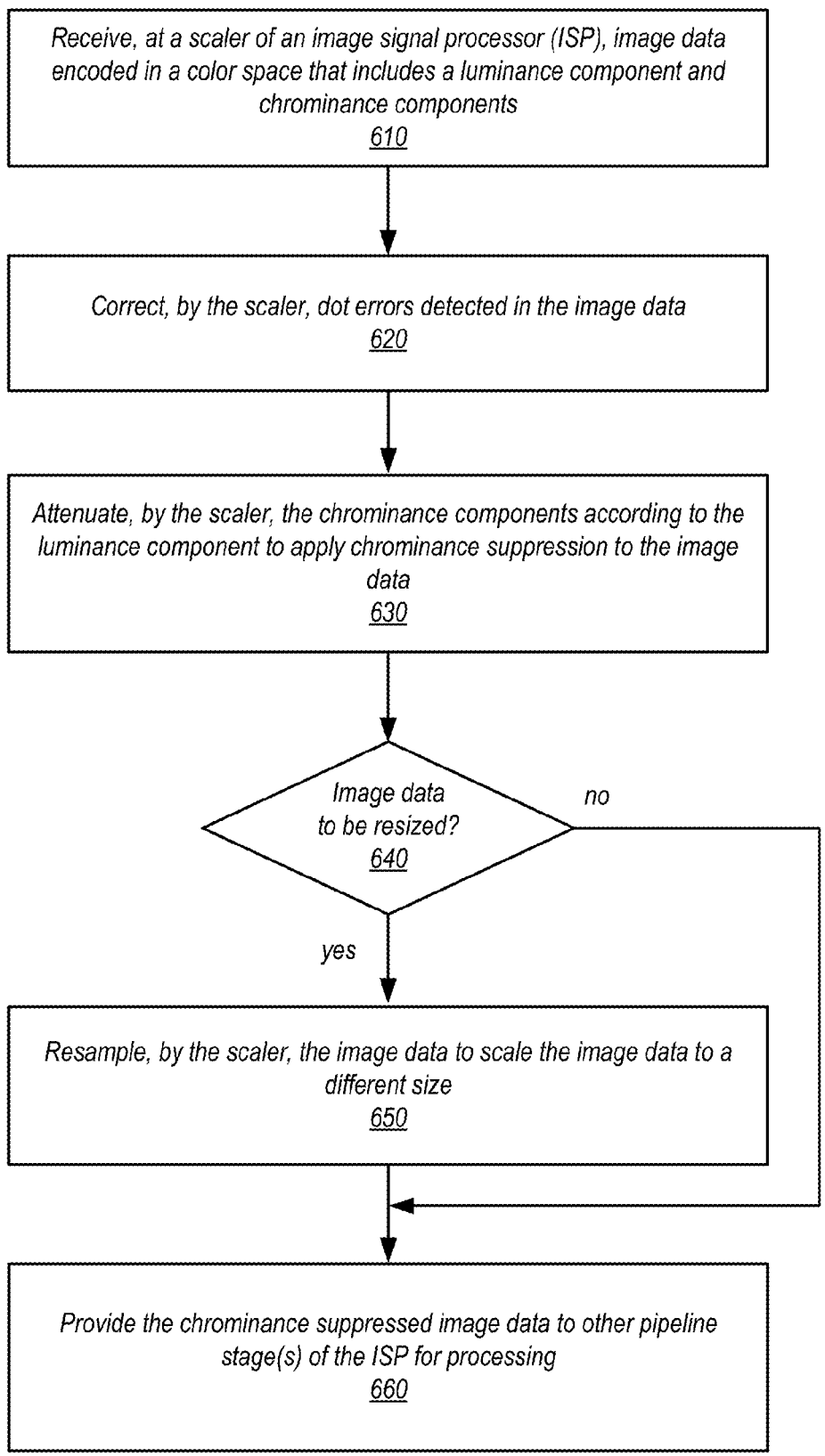
FIG. 6 is a high-level flowchart illustrating various methods and techniques for applying chroma suppression to image data in a scaler, according to some embodiments.

FIGS. 1-5 provide an example of an image processing pipeline, image signal processor, and system which may implement multi-rate processing for image data in an image processing pipeline. However, numerous other types or configurations of systems or devices that implement an image processing pipeline and image signal processor may perform multi-rate processing for image data. FIG. 6 is a high-level flowchart illustrating various methods and techniques for applying chroma suppression to image data in a scaler, according to some embodiments. The various components described above may implement these techniques (in addition to those described with regard to FIGS. 7-8 below) as well as various other image processing pipelines and image signal processors.

As indicated at 610, image data collected from an image sensor may be received at a scaler of an image signal processor (ISP). The image data may be encoded in a color space that includes a luminance component (Y) and chrominance components (Cr and Cb). In at least some embodiments, the image data may be formatted according to an initial subsampling scheme for the chrominance components (e.g., YCbCr 4:4:4) and converted by the scaler to a different subsampling scheme (e.g., YCbCr 4:2:1). As indicated at 620, dot error(s) in the image data may be corrected (if detected), as discussed in more detail below with regard to FIG. 7

The scaler may attenuate the chrominance components of the image according to the luminance component to apply chrominance suppression to the image data 630, in various embodiments. For instance, as discussed above with regard to FIG. 5 and below with regard to FIG. 8, the chrominance components may be blended with neutral and/or low pass versions of the chrominance components according to a blending ratio. The blending ratio may be determined based on the chrominance component. Other attenuation techniques, such as changing the chrominance components based on their respective orientation may also be performed. For example, an orientation value based on the arctangent of the chrominance components may be used to modify the chrominance component values of a given pixel.

The ISP may be configured, directed, or programmed, in various embodiments, to resize the image data, as indicated by the positive exit from 640. For example, various resampling techniques may be implemented to scale the image data from an initial size to a different image size (e.g., smaller or larger than the initial size), as indicated at 650. Consider the scaler 430 discussed above with regard to FIGS. 4 and 5. Scaler 430 may apply scaling techniques to resize image data to a smaller resolution in addition to applying chroma suppression to remove color artifacts in image data before performing further processing (e.g., processing at subsequent pipeline stages for display as a preview frame). Whether or not the image data is resized, as indicated by the negative exit from 640, the chroma suppressed image data may be provided to other pipeline stages, as indicated at 650, or written to storage (e.g., a memory).

Figures 7A, 7B:
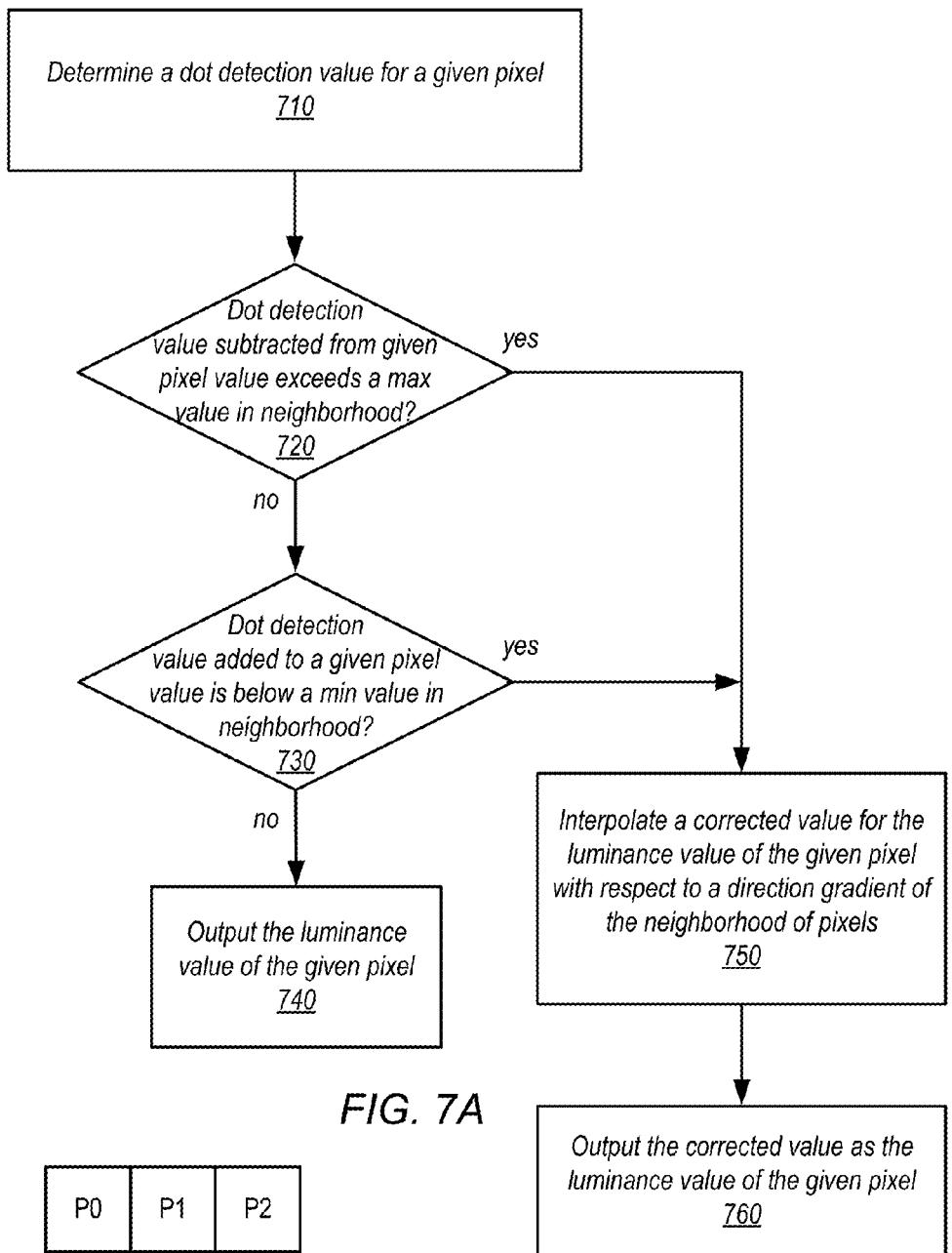
FIG. 7A is a high-level flowchart illustrating various methods and techniques for correcting dot errors in a scaler, according to some embodiments.
FIG. 7B is an example evaluation neighborhood for detecting dot errors, according to some embodiments.

As noted above, dot errors may be demosaic artifacts or other image artifacts introduced into image data in an image processing pipeline (e.g., artifacts from the long-tail of the noise distribution). In some embodiments, these artifacts may be detected and corrected prior to scaling and chroma suppression that may be performed on image data. FIG. 7A is a high-level flowchart illustrating various methods and techniques for correcting dot errors in a scaler, according to some embodiments.

As indicated at 710, a dot detection value may be determined for a given pixel under evaluation, in some embodiments. For instance, a lookup table may be implemented to interpolate a dot detection value based on the luminance value of given pixel. In this way, brightness dependent thresholds may be applied for dot error detection. Once determined, the dot detection value may be applied to the luminance value of the given pixel in different ways in order to compare the given pixel with a neighborhood of pixels including the given pixel. FIG. 7B illustrates an example pixel neighborhood 770 where P is the given pixel and P0-P7 are neighboring pixels.

For example, as indicated at 720, the dot detection value may be subtracted from the luminance value of the given pixel. If the resulting different exceeds a maximum luminance value of the neighborhood of pixels (e.g., the resulting difference value is greater than any individual pixel P0-P7), then as indicated by the positive exit from 720 a dot error may be detected for correction. Similarly, as indicated at 730, the dot detection value may be added to the luminance value of the given pixel. If the resulting sum is greater than a minimum value of the luminance values of the pixels in the neighborhood, then a dot error may be detected.

If no dot errors are detected, then the original luminance value may be output for the given pixel, as indicated at 740. If a dot error is detected, then a corrected value for the luminance value of the given pixel may be interpolated, as indicated at 750. For example, the interpolation may be performed with respect to a direction gradient of the neighborhood of pixels. Direction gradients may be determined by evaluating pixels that align in a common direction. For instance a horizontal pixel gradient may be determined by (2P−P3−P4+1)/2 (as P3 and P4 are horizontal with P). A vertical gradient may be (2P−P1−P6+1)/2 and two diagonal gradients may be (2P−P5−P2+1)/2 and (2P−P0−P7+1)/2. The minimum absolute value of these gradients may be identified and chosen as the gradient direction in which to interpolate the corrected value, in some embodiments (e.g., by subtracting the luminance value of P by the identified gradient value as calculated above).

Figure 8:
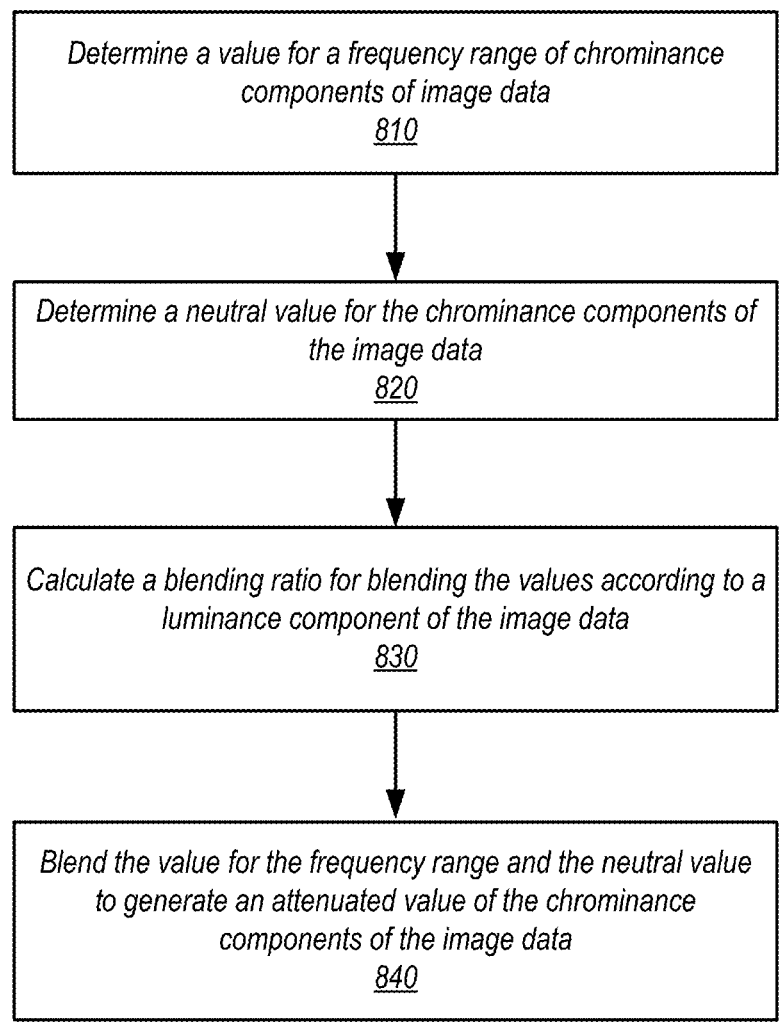
FIG. 8 is a high-level flowchart illustrating various methods and techniques for attenuating chroma components according to a luminance component of image data, according to some embodiments.

FIG. 8 is a high-level flowchart illustrating various methods and techniques for attenuating chroma components according to a luminance component of image data, according to some embodiments. Attenuating chrominance components of image data may be performed by blending chrominance component values together, as noted above. One value for blending may be a value determined for frequency range of chrominance components of image data, as indicated at 810. For example, a low pass version of chrominance components may be determined by applying a low pass filtering technique to remove frequency data higher than a particular cutoff point from image data. In this way high frequency information is removed from chrominance components, reducing the potential for errors or artifacts that are embedded in the higher frequencies of chrominance components. A neutral value for the chrominance components of the image data may also be determined, as indicated at 820. The neutral value may be a gray or other neutral color value specified by an image processor controller for performing chroma suppression.

As indicated at 830, a blending ratio for blending the value of the frequency range and the neutral value may be calculated according to the luminance component of the image data. The luminance component of the image data may better identify those areas of an image likely to include image artifacts. Edges, for example, are common locations for image artifacts and other errors to occur, and may be detected by sharp changes in luminance value. Thus, the luminance component of the image data may be evaluated to determine the blending ratio in order to guide the aggressiveness of the chroma suppression that is applied. A lookup table or other programmable structure may be implemented to provide a mechanism to calculate the blending ratio (e.g., by looking up a specific ratio or interpolating between ratios). Once the blending ratio is determined, the value for the frequency range and the neutral value may be blended, as indicated at 840, in order to generate an attenuated value of the chrominance components of the image data. As noted above, the blending ratio may be applied as a factor to the7 two different values which are then combined (e.g., (blending ratio*low pass version)+((1-blending ratio)*neutral value).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
   an image signal processor that comprises:
      one or more front-end pipeline stages;
      a scaler; and
      one or more back-end pipeline stages that are subsequent to the one or more front-end pipeline stages;
   the image signal processor, configured to:
      receive, at the scaler, image data collected as part of an image frame, wherein the image data is encoded in a color space comprising a luminance component and a plurality of chrominance components;
      resample, by the scaler, the image data in order to rescale the image frame to a different size, wherein to resample the image data the scaler is configured to:
         apply chroma suppression to the chrominance components of the image data according to the luminance component of the image data; and
      output the resampled image data to one of the one or more back-end pipeline stages.

2. The apparatus of claim 1, wherein the image signal processor is further configured to:
   prior to the resample of the image data, correct, by the scaler, one or more dot errors in the image data.

3. The apparatus of claim 1, wherein to apply chroma suppression to the chrominance components of the image data, the image signal processor is configured to:
   determine a value for a frequency range of the plurality of chrominance components of the image data;

determine a neutral value for the plurality of the chrominance components of the image data;
calculate a blending ratio for blending the value and the neutral value according to the luminance component of the image data; and
blend the value and the neutral value according to the blending ratio to generate an attenuated value of the chrominance components of the image data.

4. The apparatus of claim 1, wherein the image signal processor is further configured to:
receive, at the scaler, other image data collected as part of another image frame, wherein the other image data is encoded in the color space comprising the luminance component and the plurality of chrominance components; and
apply, by the scaler, chroma suppression to the chrominance components of the other image data according to the luminance component of the other image data to generate a chroma suppressed version of the other image data.

5. The apparatus of claim 4, wherein to resample the image data and to apply chroma suppression to the other image data, the image signal processor is configured to access stored image data in a same set of line buffers.

6. The apparatus of claim 4, wherein the other image data is received at the scaler in a 4:4:4 subsampling scheme, and wherein the image signal processor is further configured to:
prior to the application of the chroma suppression, convert the other image data into a 4:2:2 subsampling scheme; and
write the chroma suppressed version of the other image data to a memory.

7. The apparatus of claim 1, wherein the apparatus comprises a mobile computing device.

8. A method, comprising:
receiving, at a scaler implemented as part of an image signal processor, image data collected at an image sensor for an image, wherein the image data is encoded in a color space comprising a luminance component and a plurality of chrominance components;
resampling, by the scaler, the image data to scale the image to a different size, wherein the resampling comprises:
attenuating the plurality of chrominance components of the image data according to the luminance component of the image data in order to apply chrominance suppression to the image data; and
providing the resampled image data that is chrominance suppressed to a pipeline stage of the image signal processor for subsequent processing.

9. The method of claim 8, further comprising correcting one or more dot errors detected in the image data prior to resampling the image data.

10. The method of claim 9, wherein correcting the one or more dot errors detected in the image data comprises:
for a given pixel of the image data:
determining a dot detection value for the given pixel;
detecting a dot error at the given pixel, comprising:
determining that the dot detection value subtracted from a luminance value of the pixel exceeds a maximum pixel value of a neighborhood of pixels including the given pixel; or
determining that the dot detection value added to the luminance value of the pixel exceeds a minimum pixel value of the neighborhood of pixels including the given pixel; and
in response to detecting the dot error, interpolating a corrected value for the luminance value with respect to a direction gradient of the neighborhood of pixels.

11. The method of claim 8, wherein attenuating the plurality of chrominance components comprises:
determining a value for a frequency range of the plurality of chrominance components of the image data;
determining a neutral value for the plurality of the chrominance components of the image data;
calculating a blending ratio for blending the value and the neutral value according to the luminance component of the image data; and
blending the value and the neutral value according to the blending ratio to generate an attenuated value of the chrominance components of the image data.

12. The method of claim 8, further comprising:
receiving, at the scaler, other image data collected at the image sensor for another image, wherein the other image data is encoded in the color space comprising the luminance component and the plurality of chrominance components; and
resampling, by the scaler, the image data to scale the image to a different size without attenuating the plurality of chrominance components.

13. The method of claim 8, wherein the plurality of chrominance components are encoded in an initial subsampling scheme and wherein the resampling further comprises reformatting the plurality of chrominance components into a different subsampling scheme.

14. The method of claim 8, wherein the image signal processor is implemented as part of a mobile computing device that also implements the image sensor.

15. A system, comprising:
a device configured to perform image processing, the device comprising:
a sensor interface configured to receive image data from an image sensor; and
an image processing pipeline configured to:
receive, at a scaler implemented as part of the image processing pipeline, image data collected at the image sensor for an image frame via the sensor interface, wherein the image data is encoded in a color space comprising a luminance component and a plurality of chrominance components;
resample, by the scaler, the image data to scale the image to a different size, wherein the resampling comprises:
vertically scale the image data according to the different size;
attenuate the plurality of chrominance components of the vertically scaled image data according to the luminance component of the image data to apply chrominance suppression to the image data; and
horizontally scale the image data including the attenuated chrominance components according to the different size; and
output the resampled image data as part of scaled version of the image frame.

16. The system of claim 15, wherein the image processing pipeline is further configured to:
prior to the resample of the image data, correct, by the scaler, one or more dot errors in the image data.

17. The system of claim 15, wherein to attenuate the plurality of chrominance components, the image processing pipeline is configured to:

determine a value for a frequency range of the plurality of chrominance components of the image data;

determine a neutral value for the plurality of the chrominance components of the image data;

calculate a blending ratio for blending the value and the neutral value according to the luminance component of the image data; and blend the value and the neutral value according to the blending ratio to generate an attenuated value of the chrominance components of the image data.

18. The system of claim 15, wherein the image processing pipeline is further configured to:

receive, at the scaler, other image data collected at the image sensor for another image frame via the sensor interface, wherein the other image data is encoded in a color space comprising a luminance component and a plurality of chrominance components;

attenuate, by the scaler, the plurality of chrominance components of the other image data according to the luminance component of the other image data to apply chrominance suppression to the other image data; and output the other image data as part of a chrominance suppressed version of the other image frame.

19. The system of claim 18, wherein to resample the image data and to attenuate the other image data the scaler is configured to access stored image data in a same set of line buffers.

20. The system of claim 15, wherein the system further comprises an electronic display and wherein the scaled version of the image frame is displayed via the electronic display as a preview image captured via the image sensor.

* * * * *